(12) United States Patent
Matsushita et al.

(10) Patent No.: US 7,703,775 B2
(45) Date of Patent: Apr. 27, 2010

(54) METAL GASKET FOR CYLINDER HEAD

(75) Inventors: Yoshitaka Matsushita, Saitama (JP); Shigeru Kobayashi, Saitama (JP); Shinichi Hirayama, Saitama (JP); Tsunehiko Abe, Saitama (JP); Naoki Takeda, Saitama (JP)

(73) Assignees: Nippon Leakless Industry Co., Ltd, Tokyo (JP); Honda Motor Co., Ltd., Tokyo (JP)

( * ) Notice: Subject to any disclaimer, the term of this patent is extended or adjusted under 35 U.S.C. 154(b) by 405 days.

(21) Appl. No.: 11/666,458
(22) PCT Filed: Oct. 27, 2005
(86) PCT No.: PCT/JP2005/019821
§ 371 (c)(1),
(2), (4) Date: Apr. 27, 2007
(87) PCT Pub. No.: WO2006/046662
PCT Pub. Date: May 4, 2006

(65) Prior Publication Data
US 2007/0290452 A1 Dec. 20, 2007

(30) Foreign Application Priority Data
Oct. 29, 2004 (JP) ............................. 2004-315387
Oct. 26, 2005 (JP) ............................. 2005-311225

(51) Int. Cl.
F02F 11/00 (2006.01)
(52) U.S. Cl. ..................................................... 277/598
(58) Field of Classification Search ......... 277/590–593, 277/598
See application file for complete search history.

(56) References Cited

U.S. PATENT DOCUMENTS 5,628,113 A 5/1997 Tanaka et al.
6,283,480 B1 * 9/2001 Miura et al. ................. 277/593
6,935,635 B2 * 8/2005 Matsushita .................. 277/592
7,306,236 B2 * 12/2007 Imai ........................... 277/598
2004/0262850 A1 * 12/2004 Matsushita .................. 277/592
2006/0232018 A1 * 10/2006 Imai ........................... 277/598
2007/0090609 A1 * 4/2007 Kasuya ....................... 277/598

FOREIGN PATENT DOCUMENTS

| JP | 1-134762 | 9/1989 |
|---|---|---|
| JP | 7-27229 | 1/1995 |
| JP | 7-243531 | 9/1995 |
| JP | 8-233105 | 9/1996 |
| JP | 10-213227 | 8/1998 |
| JP | 2000-35134 | 2/2000 |
| JP | 2003-287137 | 10/2003 |
| JP | 2005-214329 | 8/2005 |

OTHER PUBLICATIONS

Japanese Official Action—2004-315387 & 2005-311225.

* cited by examiner

*Primary Examiner*—Thomas B Will
*Assistant Examiner*—Gilbert Y Lee
(74) *Attorney, Agent, or Firm*—Young & Thompson

(57) ABSTRACT

A metal gasket for a cylinder head has a lamination of plates. The gasket includes two base metal plates each of which includes cylinder holes, circumferential beads formed around the peripheries of individual cylinder holes, cooling water holes formed outside the peripheries of the circumferential beads, and an outer bead formed so as to entirely enclose the circumferential beads and the cooling water holes. The circumferential beads of the two base plates are aligned in a direction of thickness of the gasket. Claw shaped protrusions are provided for one of an outer step adjustment metal plate and an inner step adjustment metal plate and extend from a cooling water jacket to the outer edges of the base plates into engagement holes in the other of the inner step adjustment plate and the outer step adjustment plate.

20 Claims, 15 Drawing Sheets

METAL GASKET FOR CYLINDER HEAD

TECHNICAL FIELD

The present invention relates to a metal gasket for cylinder head, which is placed between a cylinder block of an internal combustion engine, and a cylinder head thereof.

BACKGROUND ART

As this type of metal gasket, a metal gasket shown, for example, in FIG. 3 in Japanese Patent Application Laid-Open No. 2003-287137, is known. This metal gasket for cylinder head includes: two base plates which are metal plates, and in each of which cylinder holes are formed corresponding to individual cylinder bores in a cylinder block of an internal combustion engine; circumferential beads having a both-sided sloped angular shape in cross section and formed around the individual cylinder holes; cooling water holes formed outside the peripheries of the individual circumferential beads corresponding to a cooling water jacket of the cylinder block and cooling water holes of the cylinder head; and an outer bead having a one-sided sloped shape in cross section and formed and positioned so as to enclose the circumferential beads and the cooling water holes as a whole. Further, a thin step adjustment plate made of a metal plate is placed between the two base plates.

The step adjustment plate extends outward, from the position inside the circumferential beads of the base plate to the position of the cooling water jacket, and has claw-shaped protrusions. When the claw-shaped protrusions are inserted into the cooling water holes of one of the base plates, and the portions protruding from the cooling water holes are folded over, the step adjustment plate is coupled with the base plate, so that the contact pressure exerted on the circumferential beads of the base plate, and the sealing of the combustion gas in the cylinder bores are improved.

DISCLOSURE OF THE INVENTION

Problems to be Solved by the Invention

However, according to the conventional metal gasket described above, the step differences between the circumferential beads and the outer bead of the base plate as well as the contact pressure applied to the circumferential beads, can be adjusted only by employing the thickness of the step adjustment plate that extends outward from the position inside the circumferential beads of the base plate to the position of the cooling water jacket. Therefore, there has been a problem that the lower limit for the adjustment is limited to the lower limit of a thickness available for a metal plate for the step adjustment plate and fine adjustments for the step differences can not be performed to obtain an appropriate contact pressure to be applied to the circumferential beads and the outer bead.

Means for Solving the Problems

The objective of the present invention is to advantageously solve the above-described problems. According to the present invention, a metal gasket for cylinder head of a three-plate lamination type, wherein two base plates are provided, which are metal plates, each of the base plates having cylinder holes formed corresponding to cylinder bores in a cylinder block on which a cylinder head for an internal combustion engine is mounted, circumferential beads which have a both-sided sloped angular shape in cross section and are formed around the peripheries of the cylinder holes, cooling water holes formed outside peripheries of the circumferential beads corresponding to a cooling water jacket for the cylinder block and cooling water holes in the cylinder head, and an outer bead which has a one-sided sloped shape in cross section and is formed and positioned so as to entirely enclose the circumferential beads and the cooling water holes, and wherein the circumferential beads of the two base plates are aligned in the direction of thickness of the metal gasket, is characterized in that, claw-shaped protrusions which are provided with one of inner step adjustment plate and outer step adjustment plate, are inserted into engagement holes in the other of the inner step adjustment plate and the outer step adjustment plate, the outer step adjustment plate being formed of a metal plate and extending from the position of the cooling water jacket to the positions of the outer edges of the base plates, while the inner step adjustment plate being formed of a metal plate having a thicker thickness than the outer step adjustment plate and extending from locations inside the circumferential beads of the base plates to the position of the cooling water jacket, and portions projecting through the engagement holes are folded over so as to couple the outer and the inner step adjustment plates, thus, placing the outer and inner step adjustment plates between the two base plates.

Furthermore, according to the present invention, a metal gasket for cylinder head of a two-plate lamination type, wherein a base plate is provided, which is a metal plate, the base plate having cylinder holes formed corresponding to cylinder bores in a cylinder block on which a cylinder head for an internal combustion engine is mounted, circumferential beads which have a both-sided sloped angular shape in cross section and are formed around the peripheries of the cylinder holes, cooling water holes formed outside peripheries of the circumferential beads corresponding to a cooling water jacket for the cylinder block and cooling water holes in the cylinder head, and an outer bead which has a one-sided sloped shape in cross section and is formed and positioned so as to entirely enclose the circumferential beads and the cooling water holes, is characterized in that, claw-shaped protrusions which are provided with one of inner step adjustment plate and outer step adjustment plate, are inserted into engagement holes in the other of the inner step adjustment plate and the outer step adjustment plate, the outer step adjustment plate being formed of a metal plate and extending from the position of the cooling water jacket to the positions of the outer edges of the base plates, while the inner step adjustment plate being formed of a metal plate having a thicker thickness than the outer step adjustment plate and extending from locations inside the circumferential beads of the base plates to the position of the cooling water jacket, and portions projecting through the engagement holes are folded over so as to couple the outer and the inner step adjustment plates, thus, overlapping the outer and inner step adjustment plates with the base plate.

Furthermore, according to the present invention, a metal gasket for cylinder head of a single-plate type, which is a metal plate, having cylinder holes formed corresponding to cylinder bores in a cylinder block on which a cylinder head for an internal combustion engine is mounted, circumferential beads which have a both-sided sloped angular shape in cross section and are formed around the peripheries of the cylinder holes, cooling water holes which are formed outside the peripheries of the circumferential beads corresponding to a cooling water jacket for the cylinder block and cooling water holes in the cylinder head, and an outer bead which has a one-sided sloped shape in cross section and is formed and positioned so as to entirely enclose the circumferential beads and the cooling water holes, is characterized in that, claw-shaped protrusions which are provided with one of inner step adjustment plate and outer step adjustment plate, are inserted into engagement holes formed in the other of the inner step adjustment plate and the outer step adjustment plate, the outer step adjustment plate extending from the position of the cooling water jacket to the positions of the outer edges of the base plates, while the inner step adjustment plate being formed of a metal plate having a thicker thickness than the outer step adjustment plate and extending from locations inside the circumferential beads of the base plates to the position of the cooling water jacket, and portions projecting through the engagement holes are folded over so as to couple the outer base plate and the inner base plate.

ADVANTAGES OF THE INVENTION

According to the metal gasket for cylinder head of a three-plate lamination type of the present invention, an outer step adjustment plate and a thicker inner step adjustment plate, which are positioned between the two base plates, are coupled together and positioned by fitting claw-shaped protrusions into the engagement holes thereof. And by employing the difference in the thickness of the outer step adjustment plate and the inner step adjustment plate, the step between the circumferential beads and the outer beads of the base plate, and the contact pressure applied to the circumferential beads can be adjusted.

Therefore, according to the metal gasket for cylinder head of a three-plate lamination type of the present invention, the step difference can be adjusted by employing the difference in the plate thickness of the outer step adjustment plate and the inner adjustment plate, which is thicker than the former, and the lower limit for the step adjustment can be the lower limit of the difference in the thickness of the outer step adjustment plate and the inner step adjustment plate, which is thicker than the former. Thus, even a slight step difference can be designated in order to appropriately balance the contact pressure applied to the circumferential beads and the outer bead.

In the present invention, relative to the claw-shaped protrusions inserted into the engagement holes and folded over, claw-shaped protrusion-clearance holes may be formed in at least one of the two base plates to be aligned in the direction of thickness of the metal gasket. By employing the claw-shaped protrusion-clearance holes, a phenomenon can be prevented that, at positions outside the circumferential beads in the radial direction, the claw-shaped protrusions of either the outer step adjustment plate or the inner step adjustment plate, are folded over and overlap the other plate, and are held between the two base plates. Further, it is possible to prevent claw-shaped protrusions that function as shims from partially reducing the contact pressure applied to the circumferential beads.

When the metal gasket for cylinder head of the present invention is employed for a cylinder block of an open deck type, and the deck face is wide open at the location of a cooling water jacket, a base plate facing the cylinder block can be deformed and project into the cooling water jacket. Thus, since claw-shaped-protrusion clearance holes are not much required, clearance holes need be formed only in the base plate that faces the cylinder head. When the metal gasket for cylinder head of this invention is employed for a cylinder block of a closed deck type, for which the deck face is closed at the location of a cooling water jacket, except for cooling water holes, it is preferable that claw-shaped-protrusion clearance holes be formed in both a base plate facing the cylinder block and a base plate facing the cylinder head.

Furthermore, according to the present invention, relative to the claw-shaped protrusions that are inserted into the engagement holes and folded over, claw-shaped-protrusion clearance recesses facing the claw-shaped protrusions may be formed in at least one of the two base plates, in the direction of the thickness of the metal gasket. By employing the claw-shaped-protrusion clearance recesses, a phenomenon can also be prevented whereby, at positions outside the circumferential beads in the radial direction, the claw-shaped-protrusions of either the outer step adjustment plate or the inner step adjustment plate are folded over and overlap the other plate, and are held between the two base plates. Further, it is possible to prevent the claw-shaped protrusions that can function as shims from partially reducing the contact pressure applied to the circumferential beads. In addition, with these claw-shaped-protrusion clearance recesses, since the base plate is not open at the positions of the claw-shaped protrusions, the circulation of cooling water between the cylinder block and the cylinder head at unnecessary locations can be avoided.

In a case wherein the forming of the claw-shaped-protrusion clearance recesses is effected by press molding, generally, a raised portion is generated at a corresponding outside portion of the base plate. However, when the metal gasket for cylinder head of the present invention is employed for the above described open deck cylinder block, the raised portion need only be projected inside the cooling water jacket in order to form a claw-shaped-projection clearance recess in the base plate that faces the cylinder block. In a case wherein the metal gasket for cylinder head of this invention is employed for the above described closed deck cylinder block, the above described raised portion need only be projected inside the cooling water holes opening into the deck face of the cylinder block. And when the metal gasket for cylinder head is to be mounted on either type of cylinder block, the raised portion must be projected inside the cooling water holes opening in the deck face of the cylinder head in order to form a claw-shaped-projection clearance recess in the base plate that faces the cylinder head.

Further, according to the metal gasket for cylinder head of a two-plate lamination type of the present invention, an outer step adjustment plate and a thicker inner step adjustment plate, which are positioned with overlapping the two base plates, are coupled together and positioned by fitting claw-shaped protrusions into the engagement holes thereof. And by employing the difference in the thickness of the outer step adjustment plate and the inner step adjustment plate, the step between the circumferential beads and the outer beads of the base plate, and the contact pressure applied to the circumferential beads can be adjusted.

Therefore, according to the metal gasket for cylinder head of a two-plate lamination type of the present invention, the lower limit for the step adjustment can be the lower limit of the difference in the thickness of the outer step adjustment plate and the inner step adjustment plate, which is thicker that the former. Thus, even a slight step difference can be designated in order to appropriately balance the contact pressure applied to the circumferential beads and the outer bead.

In the present invention, relative to the claw-shaped protrusions inserted into the engagement holes and folded over, claw-shaped-protrusion clearance holes may be formed in the two base plates to be aligned in the direction of thickness of the metal gasket. By employing the claw-shaped-protrusion clearance holes, a phenomenon can be prevented that, at positions outside the circumferential beads in the radial direction, the claw-shaped protrusions of either the outer step adjustment plate or the inner step adjustment plate, are folded over and overlap the other plate, and are overlapped with the base plate. Further, it is possible to prevent claw-shaped protrusions that function as shims from partially reducing the contact pressure applied to the circumferential beads.

Furthermore, according to the present invention, relative to the claw-shaped protrusions that are inserted into the engagement holes and folded over, claw-shaped-protrusion clearance recesses facing the claw-shaped protrusions may be formed in the base plate to be aligned in the direction of the thickness of the metal gasket. By employing the claw-shaped-protrusion clearance recesses, a phenomenon can also be prevented whereby, at positions outside the circumferential beads in the radial direction, the claw-shaped protrusions of either the outer step adjustment plate or the inner step adjustment plate are folded over and overlap the other plate, and are overlapped with the base plate. Further, it is possible to prevent the claw-shaped protrusions that can function as shims from partially reducing the contact pressure applied to the circumferential beads. In addition, with these claw-shaped-protrusion clearance recesses, since the base plate is not open at the positions of the claw-shaped-protrusions, the circulation of cooling water between the cylinder block and the cylinder head at unnecessary locations can be avoided.

Further, according to the present invention, the inner step adjustment plate may have circumferential beads, having a crescent shape in cross section, that are arranged in the direction of the thickness of the metal gasket relative to the circumferential beads of the base plates, and that are projected in opposite directions. According to this arrangement, for the two-plate or three-plate lamination metal gasket, circumferential beads to be overlapped can be increased, and the sealing for the gas produced by the combustions in the cylinder bores can be improved.

In addition, according to the metal gasket for cylinder head of a single-plate type of the present invention, an outer step adjustment plate and a thicker inner step adjustment plate are coupled together and positioned by fitting claw-shaped protrusions into the engagement holes thereof. And by employing the difference in the thickness of the outer step adjustment plate and the inner step adjustment plate, the step between the circumferential beads and the outer beads of the base plate, and the contact pressure applied to the circumferential beads can be adjusted.

Therefore, according to the metal gasket for cylinder head of a single-plate type of the present invention, the lower limit for the step adjustment can be the lower limit of the difference in the thickness of the outer base plate and the inner base plate, which is thicker than the former. Thus, even a slight step difference can be arranged in order to appropriately balance the contact pressure applied to the circumferential beads and the outer bead.

According to the present individual inventions, the claw-shaped protrusions may be provided for the outer step adjustment plate or the outer base plate, and the engagement holes may be formed in the inner step adjustment plate or in the inner base plate. With this arrangement, since the claw-shaped protrusions to be folded over are made of a thinner plate than either the outer step adjustment plate or the inner step adjustment plate, the processing for bending the claw-shaped protrusions can be improved.

BEST MODES FOR CARRYING OUT THE INVENTION

Figure 1:
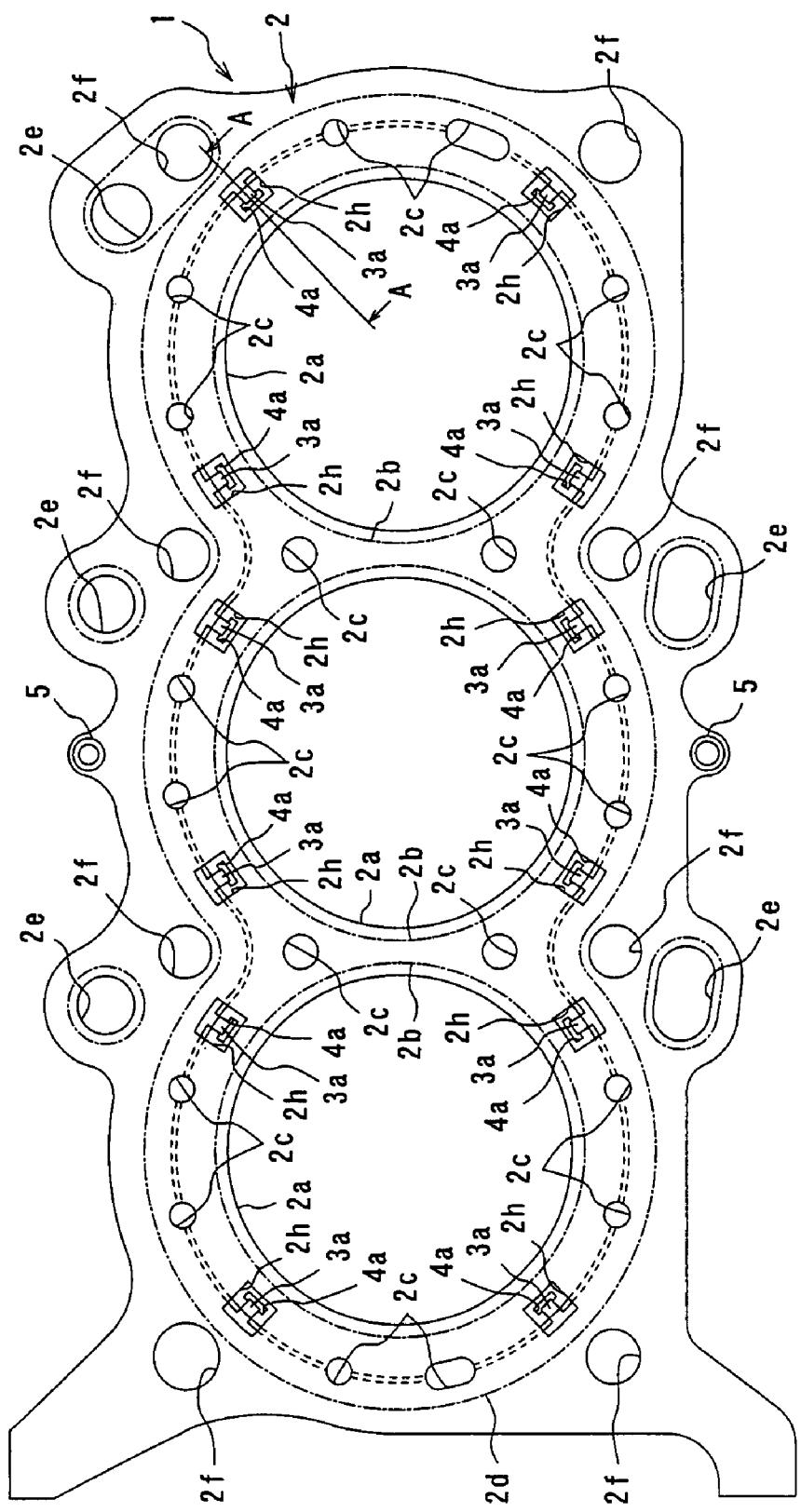
FIG. 1 is a general plan view of a metal gasket for cylinder head according to a first embodiment of the present invention.
Figure 2:
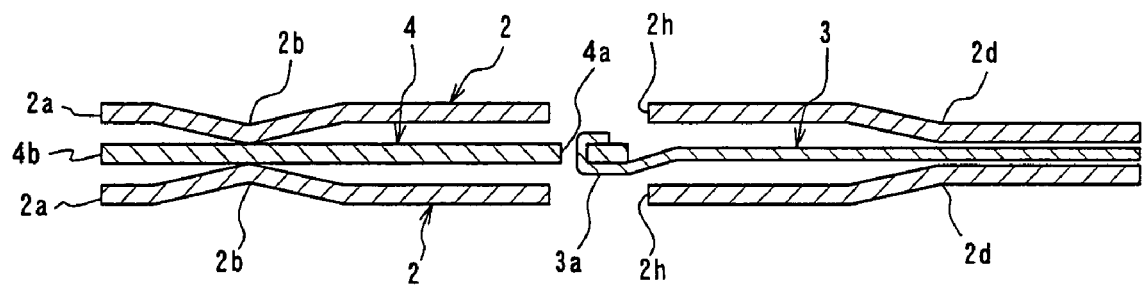
FIG. 2 is a cross-sectional view of the metal gasket of the first embodiment, taken along line A-A in FIG. 1.
Figure 3:
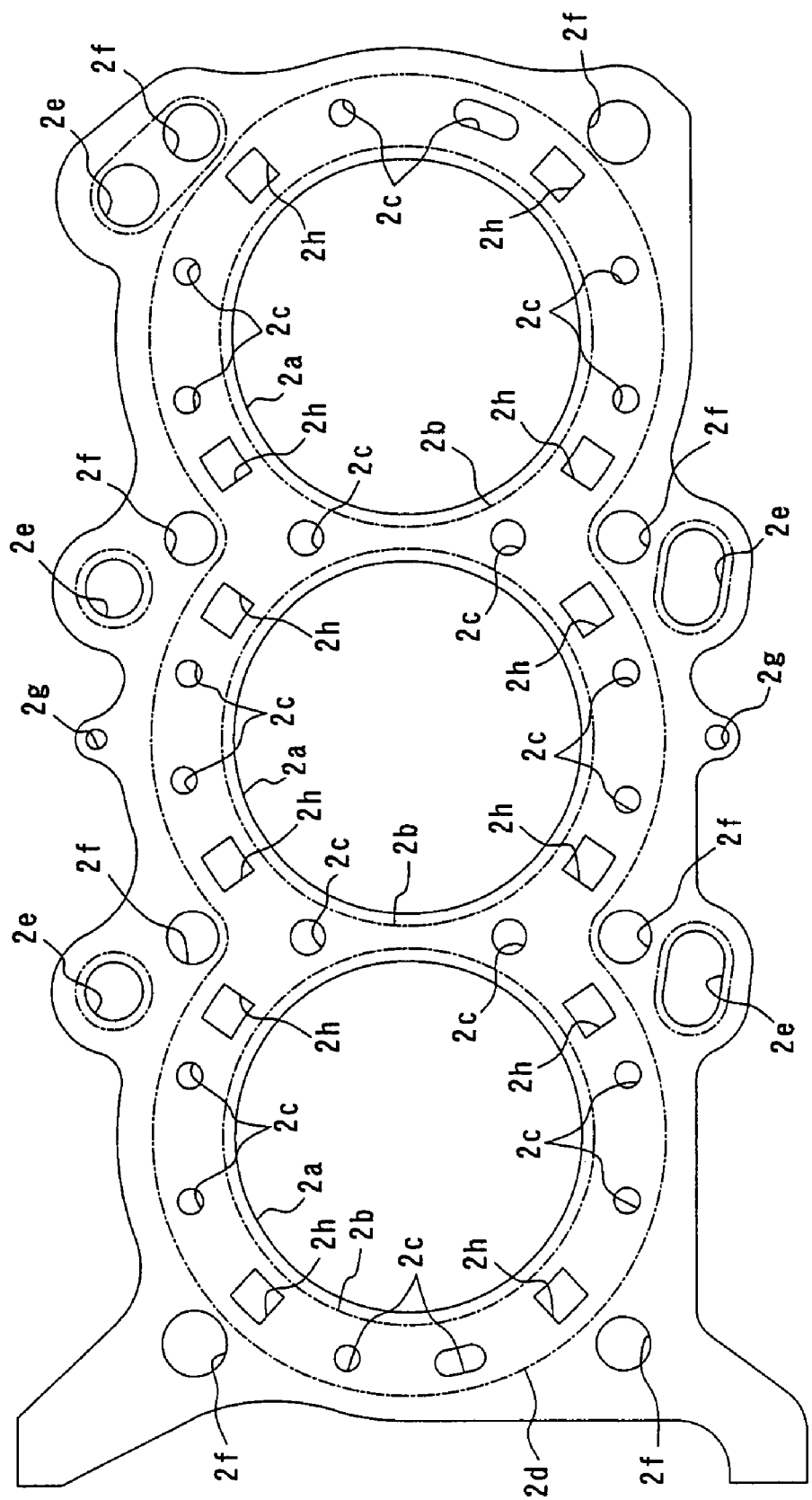
FIG. 3 is a plan view of a base plate for the metal gasket of the first embodiment.
Figure 4:
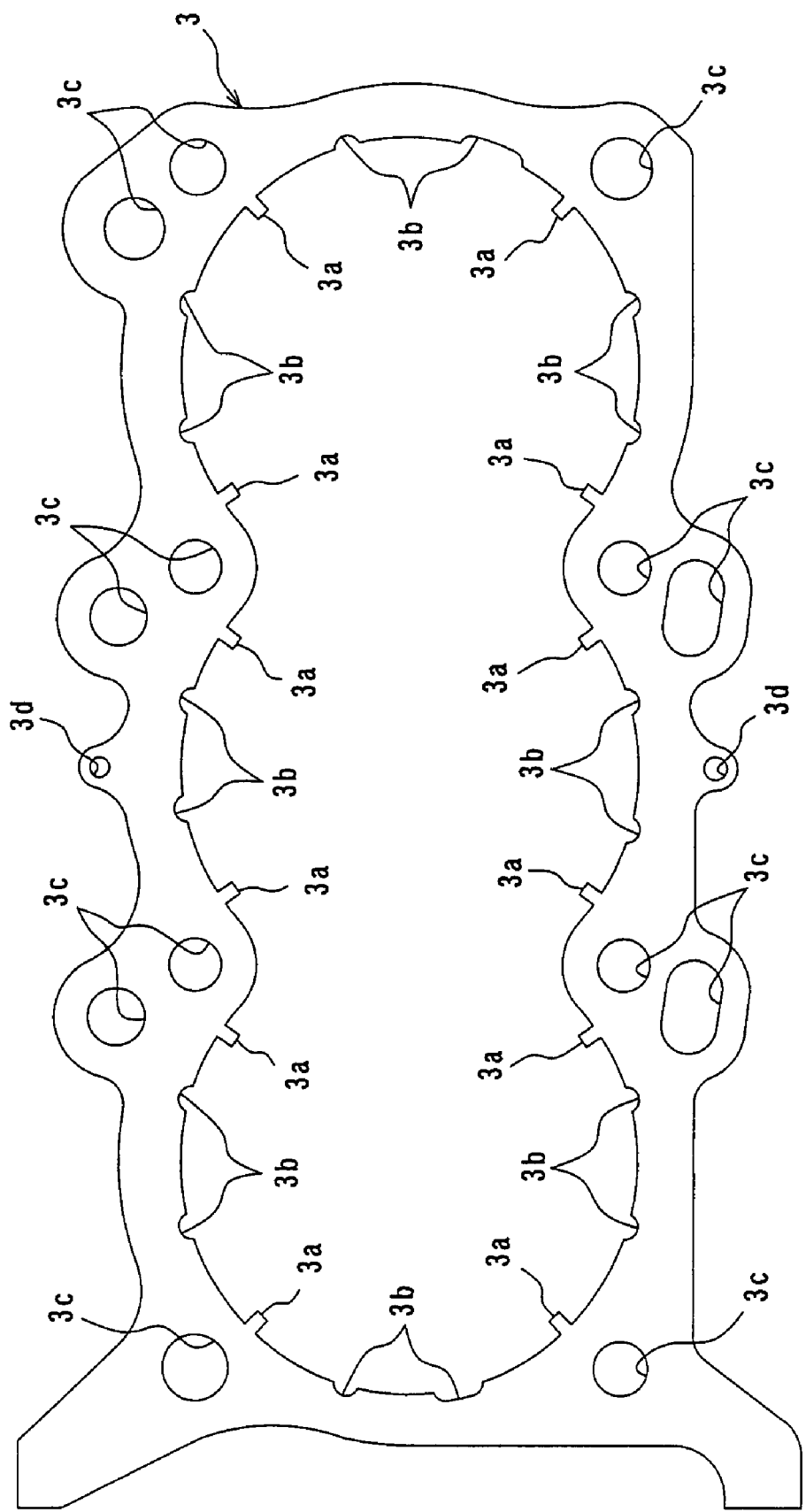
FIG. 4 is a plan view of an outer step adjustment plate for the metal gasket of the first embodiment.
Figure 5:
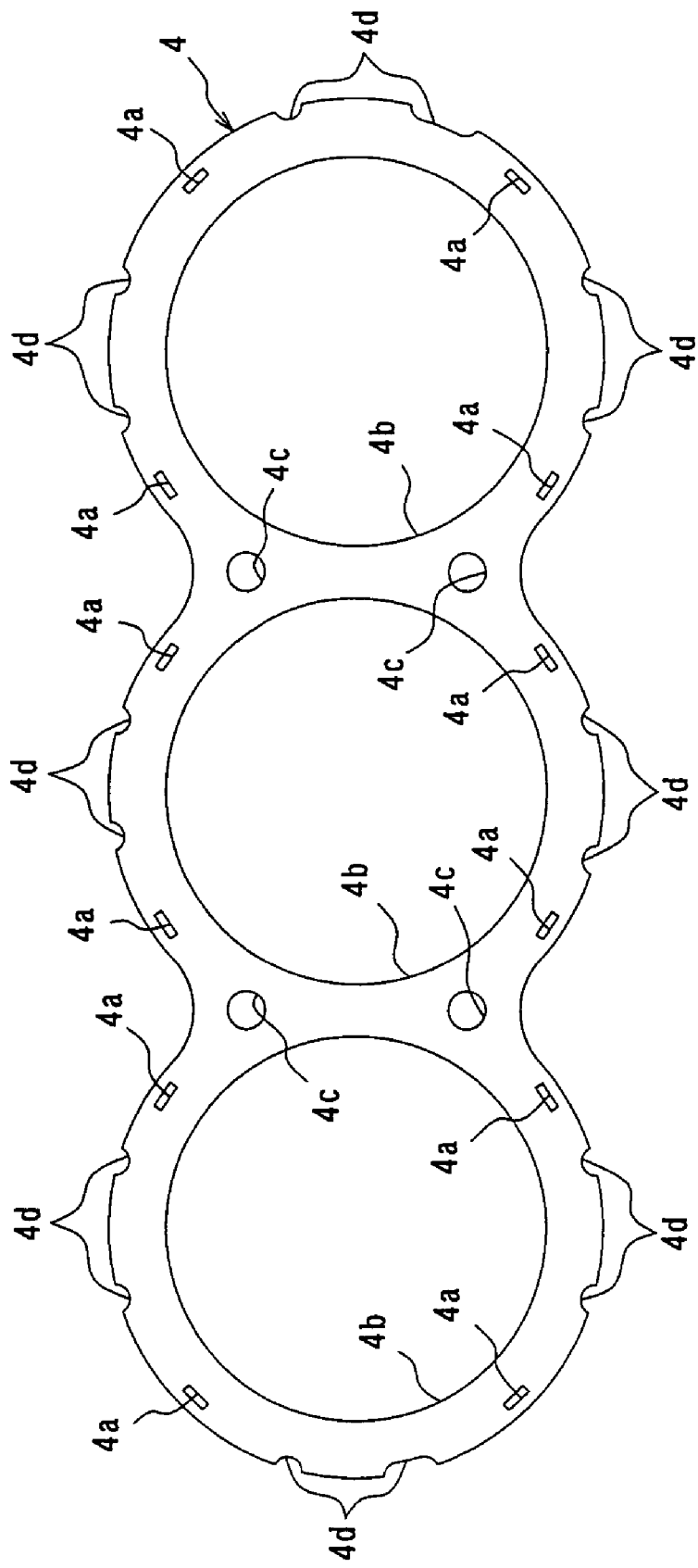
FIG. 5 is a plan view of an inner step adjustment plate for the metal gasket of the first embodiment.
Figure 6:
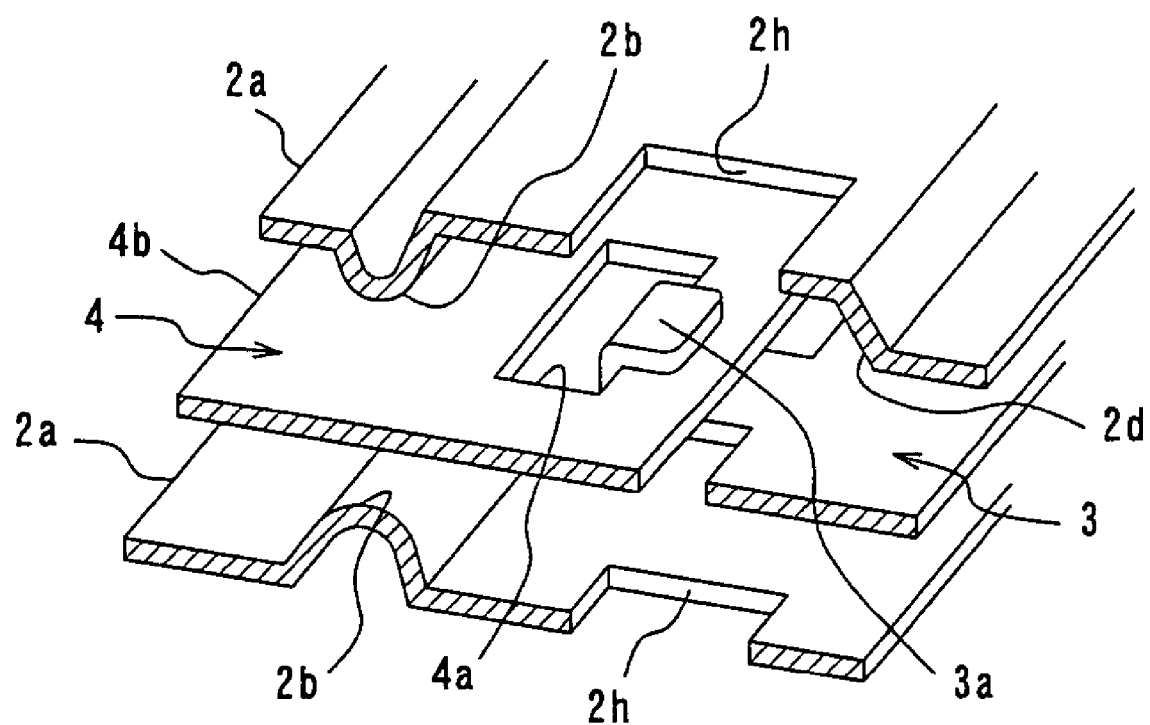
FIG. 6 is a perspective view of a cross section, of the metal gasket of the first embodiment, taken near line A-A in FIG. 1.

The mode of the present invention will now be described in detail by employing embodiments and while referring to drawings. FIG. 1 is a general plan view of a metal gasket for cylinder head, according to a first embodiment of the present invention; FIG. 2 is a cross-sectional view of the metal gasket of the first embodiment, taken along line A-A in FIG. 1; FIG. 3 is a plan view of the base plate of the metal gasket for the first mode; FIG. 4 is a plan view of the outer step adjustment plate of the metal gasket for the first embodiment; FIG. 5 is a plan view of the inner step adjustment plate of the metal gasket of the first mode; and FIG. 6 is a perspective view of a cross section near line A-A in FIG. 1. In the drawings, reference numeral 1 denotes a metal gasket; 2, a base plate; 3, an outer step adjustment plate; and 4, an inner step adjustment plate.

In the first embodiment, the metal gasket for cylinder head 1 is a three-plate lamination type that, as shown in FIG. 2, has two base plates 2, which are metal plates made of stainless steel. As shown in FIG. 3, each of these base plates 2 includes: a plurality (three in the drawing) of cylinder holes 2a, which are formed corresponding to the cylinder bores in a cylinder block of an engine, an internal combustion engine, with which the metal gasket 1 is to be assembled and on which a cylinder head is to be mounted; circumferential beads 2b having a both-sided sloped angular shape in cross section, which are formed around the peripheries of the cylinder holes 2a; multiple cooling water holes 2c, which are formed, outside the peripheries of the circumferential beads 2b, corresponding to the cooling water jacket of the cylinder block and the cooling water holes in the cylinder head; and an outer bead 2d having a one-sided sloped shape in cross section, which is formed and positioned so as to entirely enclose the circumferential beads 2b and the cooling water holes 2c.

Furthermore, a plurality of lubricating oil holes 2e, a plurality (eight in the drawing) of bolt holes 2f, into which head bolts are to be inserted to secure the cylinder head to the cylinder block, and grommet holes 2g, which will be described later, are formed outside the outer beads 2d of the two base plates 2. The circumferential beads 2b of these two base plates 2 are positioned in the direction of thickness of the gasket 1, and are projected inward, in opposite directions, and facing each other. The outer beads 2d of the two base plates 2 are also positioned in the direction of thickness of the gasket 1, and are projected inward, opposite directions, and facing each other.

Further, in the metal gasket for cylinder head 1 of the first embodiment, as shown in FIG. 2, an outer step adjustment plate 3, which is a metal plate that, for example, is thinner than the base plate 2 and is made of stainless steel, and an inner step adjustment plate 4, which is a metal plate that, for example, is as thick as the base plate 2 and is made of stainless steel, are inserted between the two base plates 2. As shown in FIG. 4, the outer step adjustment plate 3 is extended from the position corresponding to the cooling water jacket of the cylinder block of the engine to the position of the outer end area of the two base plates 2. This outer step adjustment plate 3 includes: a plurality (four for each cylinder hole 2a in the base plate 2 in the drawing) claw-shaped protrusions 3a, which are projected inwardly from the positions on the inner edge consonant with the cooling water jacket; semi-circular or semi-oval clearance recesses 3b, which are formed in the inner edge corresponding to the cooling water holes 2c of the base plates 2; and a plurality of holes 3c and grommet holes 3d that will be described later, which are consonant respectively with the lubricating oil holes 2e and the bolt holes 2f of the base plates 2. Referring to FIG. 2, the area near the claw-shaped protrusions 3a is lowered in advance to the half bead state, so that the inner step adjustment plate 4 and the outer step adjustment plate 3 are located on the same plane, and the upper faces of the claw-shaped protrusions 3a are aligned with the lower face of the inner step adjustment plate 4. However, instead of lowering the area to the half bead state, as shown in FIG. 6 flat claw-shaped protrusions 3a may be aligned under the inner step adjustment plate 4. Thus, when the gasket is held between the cylinder block and the cylinder head, the area near the claw-shaped protrusions 3a will be displaced to the half bead state, and the inner step adjustment plate 4 and the outer step adjustment plate 3 will be aligned on the same plane.

On the other hand, as shown in FIG. 5, the inner step adjustment plate 4 in this case is extended from the positions of the inner edges of the cylinder holes 2a, which are the inner positions of the circumferential beads 2b of the base plates 2, to the position of the cooling water jacket. And the inner step adjustment plate 4 includes engagement holes (rectangular holes in the drawing) 4a, which are located at positions consonant with the multiple claw-shaped protrusions 3a of the outer step adjustment plate 3 for the insertion of the claw-s 3a, and also includes: cylinder holes 4b, consonant with the cylinder holes 2a of the individual base plates 2; holes 4c, consonant with the cooling water holes 2c of the base plates 2; and semi-circular or semi-oval clearance recesses 4d, which are formed in the outer edge consonant with the cooling water jacket, and are located at positions consonant with the cooling water holes 2c of the base plate 2.

Further, as shown in FIGS. 1 and 6, in the metal gasket for cylinder head 1 of the first embodiment, the claw-shaped protrusions 3a of the outer step adjustment plate 3 are inserted into the engagement holes 4a of the inner step adjustment plate 4 from below the inner step adjustment plate 4, and the portions projecting outward from the engagement holes 4a are folded over onto the inner step adjustment plate 4. In this manner, the claw-shaped protrusions 3a are hooked through the engagement holes 4a, and the outer step adjustment plate 3 and the inner step adjustment plate 4 are coupled, so that portions other than the claw-shaped protrusions 3a do not overlap each other in the direction of the thickness. Further, in order that the metal gasket for cylinder head 1 of the first embodiment can be appropriately used for a closed deck type cylinder block, wherein the deck face, other than the cooling water holes, is closed at the position of the cooling water jacket, as shown in FIGS. 1, 2 and 3, the two base plates 2 include claw-shaped-protrusion clearance holes 2h, which are aligned in the direction of the thickness of the metal gasket for cylinder head 1 in order to permit the entry of the claw-shaped protrusions 3a that have been inserted into respective engagement holes 4a and have been folded over.

In addition, as shown in FIG. 1, in the metal gasket for cylinder head 1 of the first embodiment, common grommets 5 are inserted through the grommet holes 2g, 3d, of the two base plates 2 and the outer step adjustment plate 3 located between them, that are aligned with each other, and protruding parts of the common grommets 5 are folded over and cramped, so that the two base plates 2 and the outer step adjustment plates 3 and the inner step adjustment plates 4 located between them are correctly positioned. It should be noted that since these grommet holes 2g, 3d are located outside the positions of the cylinder block and the cylinder head of the engine, the grommets 5 will not be held between the cylinder block and the cylinder head of the engine and reduce the contact pressure applied to the beads 2b, 2d.

For the metal gasket cylinder head 1 of the first embodiment described above, the outer step adjustment plate 3 and the thicker inner step adjustment plate 3, which are located between the two base plates 2, are coupled together and positioned by inserting the claw-shaped protrusions 3a of one of these plates, i.e., the outer step adjustment plate 3, into the engagement holes 3a of the other plate, i.e., the inner step adjustment plate 3. And by employing the difference in the thickness of the outer step adjustment plate 3 and the inner step adjustment plate 4, which is thicker than the former, the step difference between the circumferential beads 2b of the base plate 2 and the outer bead 2d, as well as the contact pressure on the circumferential beads 2b, is adjusted.

Therefore, according to the metal gasket for cylinder head 1 of a three-plate lamination type of the first embodiment 1, since the contact pressure applied to the circumferential beads 2b of the base plates 2 can be increased by employing the step difference that is adjusted by altering the difference in the thickness of the outer step adjustment plate 3 and the inner step adjustment plate 4, which is thicker than the former, the sealing of the gas of combustion in the cylinder bores can be improved. Furthermore, since the lower limit of the adjustment of the step is the lower limit of the difference in the thickness of the outer step adjustment plate 3 and the inner step adjustment plate 4, which is thicker than the former, even a small step difference can be arranged in order to obtain an appropriate contact pressure balance for the circumferential beads 2b and the outer bead 2d.

In addition, according to the metal gasket for cylinder head 1 of the first embodiment, the two base plates 2 include, relative to the claw-shaped protrusions 3a that have been inserted into the respective engagement holes 4a and folded over, the claw-shaped-protrusion clearance holes 2h that are aligned in the direction of the thickness of the metal gasket 1. Thus, for the use in a cylinder block of a closed deck type, the claw-shaped-protrusion clearance holes 2h, which are formed both in the base plate 2, which faces the cylinder block, and in the base plate 2, which faces the cylinder head, can prevent the appearance of a state wherein the claw-shaped protrusions 3a of the outer step adjustment plate 3 are held between the two base plates 2, after being folded over and overlapping the inner step adjustment plate 4 at positions outside the circumferential beads 2b in the radial direction. Further, a phenomenon wherein the claw-shaped protrusions 3a function as shims, and partially reduce the contact pressure applied to the circumferential beads 2b, can be prevented.

Figure 7:
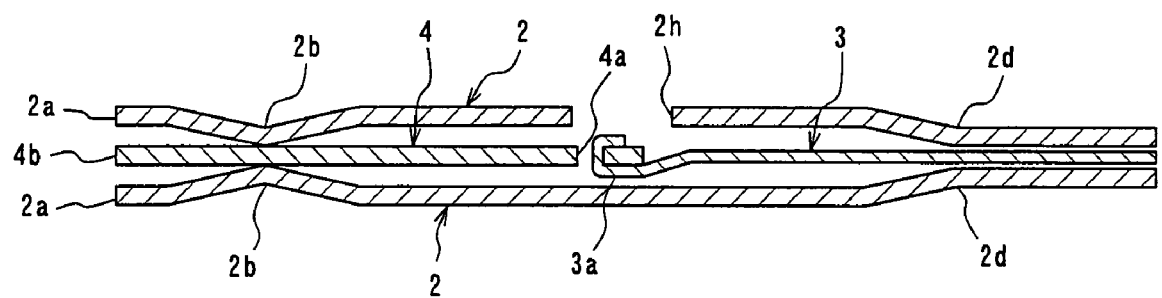
FIG. 7 is a cross-sectional view, taken at the same position as in FIG. 2, of the structure of a metal gasket for cylinder head according to a second embodiment of the present invention.
Figure 8:
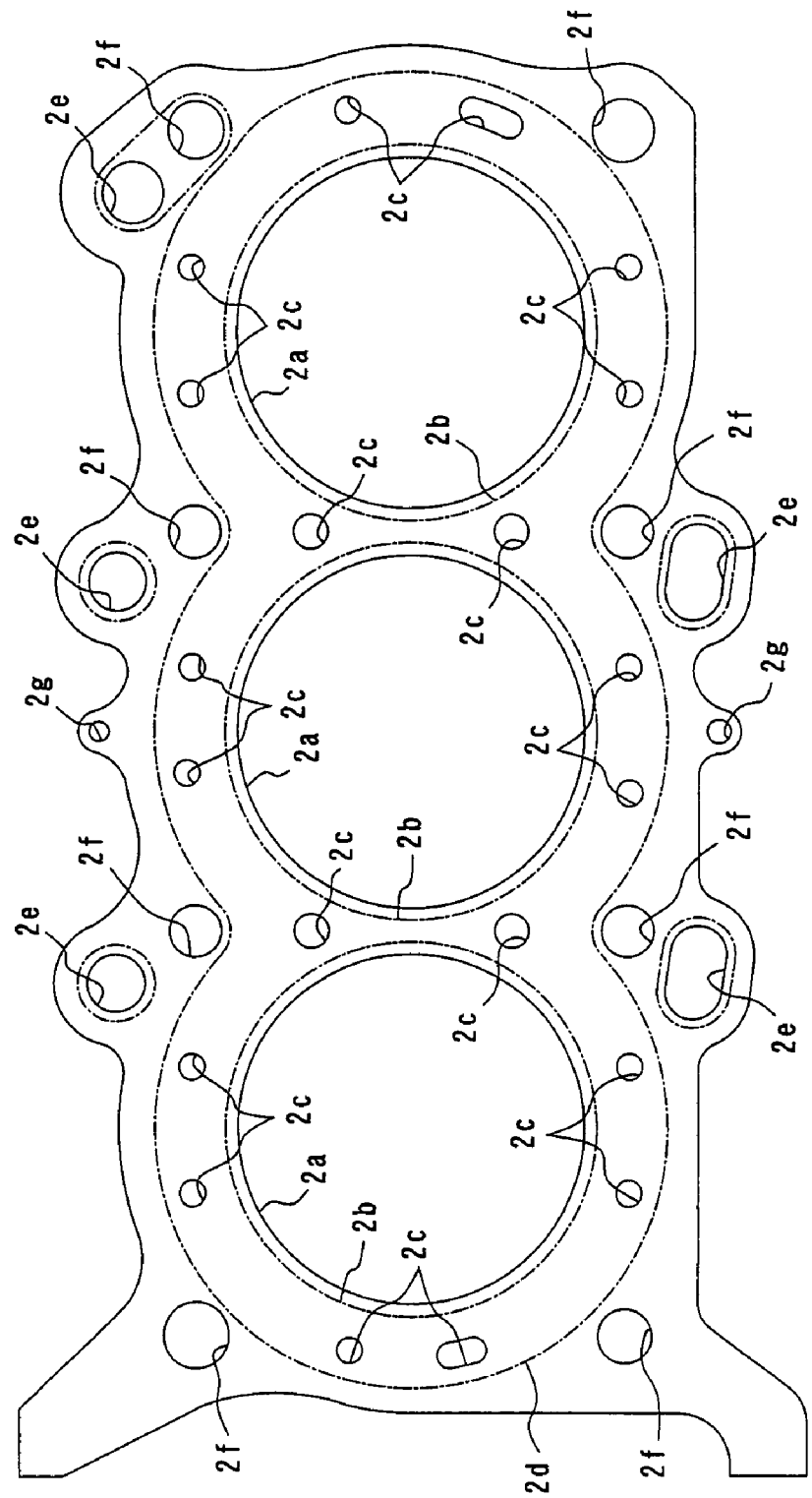
FIG. 8 is a plan view of a base plate, for the metal gasket of the second embodiment, that faces a cylinder block.

FIG. 7 is a cross-sectional view of a metal gasket for cylinder head, according to a second embodiment of the present invention, and FIG. 8 is a plan view of a base plate (the lower one in FIG. 7) that faces the cylinder block of the metal basket according to the second embodiment. The portions in the drawings corresponding to those in the previous embodiment are denoted by using the same references. The metal gasket for cylinder head 1 of the second embodiment is a three-plate lamination type, as of the first embodiment, and differs from the metal gasket for cylinder head 1 of the first embodiment only in that: in order to be appropriately used for an open deck cylinder block wherein the deck face is opened widely at the position of a cooling water jacket, a base plate (a lower base plate in the drawing that faces the cylinder block) 2 differs from the base plate 2 in FIG. 3; and as shown in FIG. 8, claw-shaped-protrusion clearance holes 2h are not formed. The other portions are arranged in the same manner as for the metal gasket 1 of the first embodiment.

With the metal gasket for cylinder head 1 of the second embodiment, the same operational effects as in the first embodiment are also obtained. Further, according to the metal gasket for cylinder head 1 of the second embodiment, the base plate (the upper base plate in the drawing) 2, of the two base plates 2, that faces the cylinder head includes the claw-shaped-protrusion clearance holes 2h that are aligned in the direction of the thickness of the metal gasket 1, relative to the respective claw-shaped protrusions 3a that are inserted into the respective engagement holes 4a and folded over. Thus, for use in an open deck cylinder block, the claw-shaped-protrusion clearance holes 2h, which are formed in the base plate 2 that faces the cylinder head, can prevent the appearance of a state wherein the folded over portions of the claw-shaped protrusions 3a are pressed against the deck face of the cylinder head, and are held between the two base plates 2 at positions outside the circumferential beads 2b in the radial direction of the cylinder holes 2a. Further, a phenomenon wherein the folded portions of the claw-shaped protrusions 3a function as shims, reducing the contact pressure on the circumferential beads 2b, can also be prevented.

Figure 9:
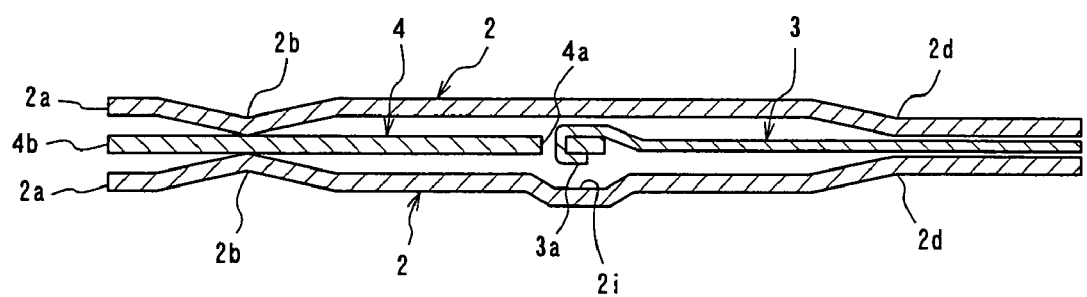
FIG. 9 is a cross-sectional view, taken at the same position as shown in FIG. 2, of the structure of a metal gasket for cylinder head according to a third embodiment of the present invention.
Figure 10:
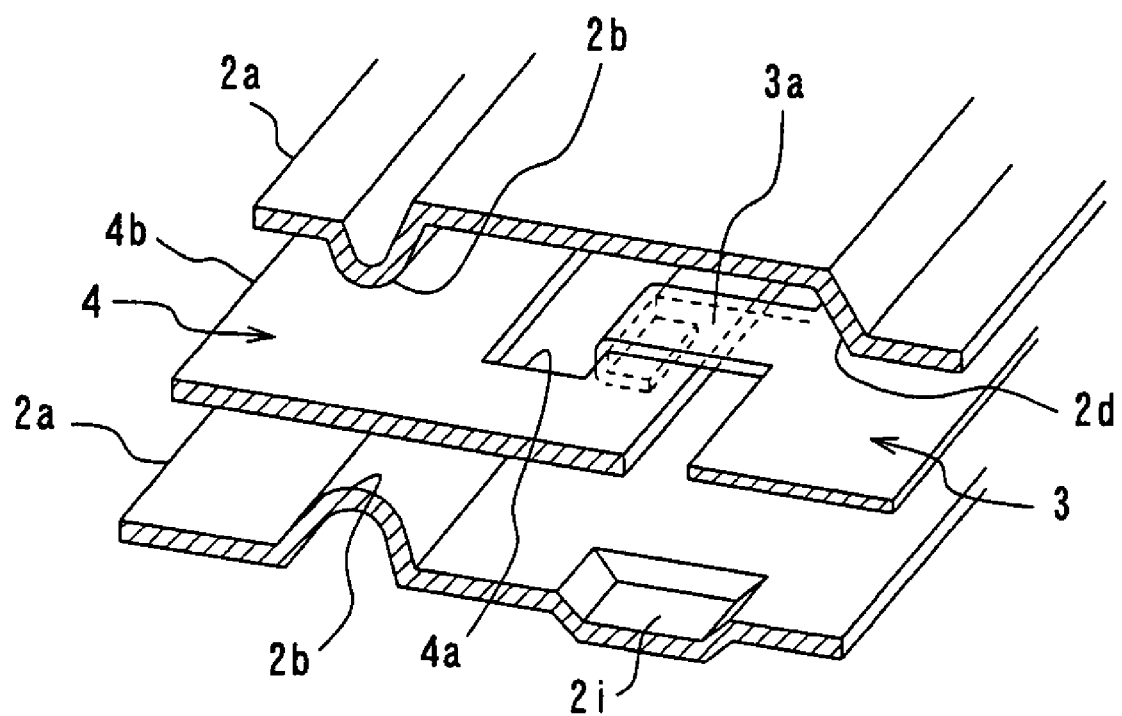
FIG. 10 is a perspective view of the cross section of the metal gasket of the third embodiment, taken near the same position as shown in FIG. 9.

FIG. 9 is a cross sectional view of a metal gasket for cylinder head according to a third embodiment of this invention, and FIG. 10 is a perspective view of a cross section of the metal gasket of the third embodiment that is near the same position as that in FIG. 9. In the drawings, the portions corresponding to those in the previous embodiment are denoted by using the same reference numerals. A metal gasket for cylinder head 1 of the third embodiment, which is the same three-plate lamination type as that of the second embodiment, differs from the metal gasket for cylinder head 1 of the second embodiment only in that: in order to be appropriately used for an open deck type cylinder block, wherein the deck face is opened widely at the location of a cooling water jacket, unlike the base plate 2 in FIG. 8, a base plate (a lower base plate in FIG. 9) 2 that faces a cylinder block includes, as shown in FIGS. 9 and 10, claw-shaped-protrusion clearance recesses 2i, which are, for example, embossed by pressure applied at positions corresponding to the claw-shaped-protrusion clearance holes 2h of the base plate 2 in FIG. 3 and are directed toward claw-shaped protrusions 3a while, like the base plate 2 in FIG. 8, a base plate (an upper base plate in FIG. 9) 2 that faces a cylinder head does not include claw-shaped-protrusion clearance holes 2h; and claw-shaped protrusions 3a, on an outer step adjustment plate 3, are inserted into engagement holes 4a in an inner step adjustment plate 4, from above the inner step adjustment plate 4, and the portions that extend outward, from the engagement holes 4a, are folded over, under the inner step adjustment plate. The other portions are arranged in the same manner as are those for the metal gasket for cylinder head 2 of the second embodiment.

According to the metal gasket for cylinder head 1 of the third embodiment, the lower base plate 2, which faces the cylinder block, also includes the claw-shaped-protrusion clearance recesses 2i, which are aligned in the direction of the thickness of the metal gasket 1, relative to the respective claw-shaped-protrusions 3a that are inserted into the engagement holes 4a and folded over. Thus, the convex portions, which are extended outside the lower base plate 2, corresponding to the claw-shaped-protrusion clearance recesses 2i formed in this base plate 2, enter the cooling water jacket opening of the deck face of the cylinder block, while the claw-shaped protrusions 3a of the outer step adjustment plate 3 enter the protrusion clearance recesses 2i that are formed in the lower base plate 2. Therefore, the same operational effects can be acquired as those obtained in the second embodiment. Further, according to the metal gasket for cylinder head 1 for the third embodiment, since the opening of the base plate 2 is prevented at the positions of the claw-shaped protrusions 3a because of the claw-shaped-protrusion clearance recesses 2i, the circulation of cooling water, between the cylinder block and the cylinder head, at an unnecessary locations can be avoided.

Figure 11:
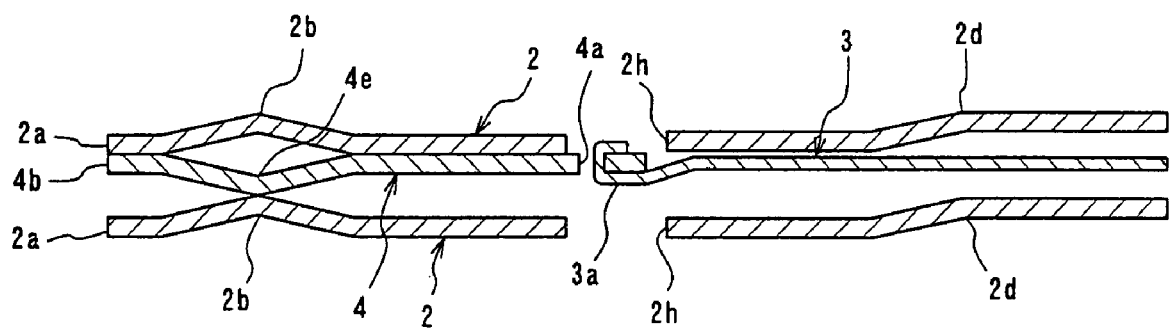
FIG. 11 is a cross sectional view, taken at the same position as shown in FIG. 2, of the structure of a metal gasket for cylinder head according to a fourth embodiment of the present invention.

FIG. 11 is a cross-sectional view of a metal gasket for cylinder head according to a fourth embodiment of the present invention, and in the drawing, the same portions as in the previous embodiments are denoted by the same reference numerals. A metal gasket for cylinder head 1 of the fourth embodiment, which is of the same three-plate lamination type as of the first embodiment, differs from the metal gasket for cylinder head 1 of the first embodiment only in that: in order to be appropriately used for a closed deck type cylinder block, wherein the deck face, other than the cooling water holes, is closed at the location of a cooling water jacket, two base plates 2, in addition to those of the first embodiment, include claw-shaped-protrusion clearance holes 2h, and an inner step adjustment plate 4 includes an circumferential bead 4e, which has a crescent shape in cross section, that is aligned with circumferential beads 2b on the two base plates 2, in the direction of the thickness of the metal gasket 1, that are projected in directions opposite to those of the beads 2b; and accordingly, the circumferential bead 2b and the outer bead 2d on the base plate 2 that faces the cylinder head are projected in the direction the reverse of that in the first embodiment. The other portions are arranged in the same manner as are those for the metal gasket for cylinder head 1 of the first embodiment.

For the metal gasket for cylinder head 1 of the fourth embodiment, the same operating effects can be obtained as are obtained in the first embodiment above. Further, according to the metal gasket for cylinder head 1 of the fourth embodiment, the number of circumferential beads to be laminated in a metal gasket for cylinder head of a three-plate lamination type can be increased, and the sealing provided for combustion gas in the cylinder bores can be even more improved.

Figure 12:
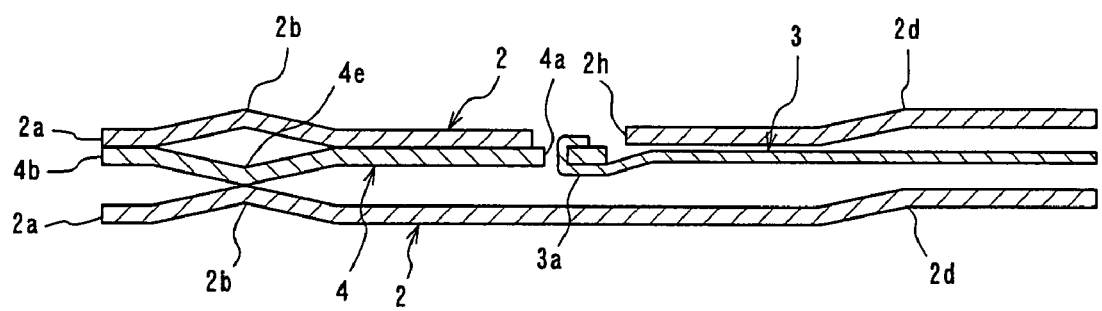
FIG. 12 is a cross-sectional view, taken at the same position as shown in FIG. 2, of the structure of a metal gasket for cylinder head according to a fifth embodiment of the present invention.

FIG. 12 is a cross-sectional view of a metal gasket for cylinder head according to a fifth embodiment of the present invention, and the portions in the drawings corresponding to those in the previous embodiments are denoted by using the same references. The metal gasket for cylinder head 1 of the fifth embodiment is a three-plate lamination type, as of the fourth embodiment, and differs from the metal gasket for cylinder head 1 of the fourth embodiment only in that: in order to be appropriately used for an open deck cylinder block wherein the deck face is opened widely at the position of a cooling water jacket, a base plate (a lower base plate in the drawing) 2 that faces the cylinder block differs from the base plate 2 in FIG. 3; as shown in FIGS. 8 and 12, claw-shaped-protrusion clearance holes 2h are not formed. The other portions are arranged in the same manner as for the metal gasket 1 of the fourth embodiment.

With the metal gasket cylinder head 1 of the fifth embodiment, the same operational effects as in the fourth embodiment are also obtained. Further, according to the metal gasket for cylinder head 1 of the fifth embodiment, the base plate (the upper base plate in the drawing) 2, of the two base plates 2, that faces the cylinder head includes the claw-shaped-protrusion clearance holes 2h that are aligned in the direction of the thickness of the metal gasket 1, relative to the respective claw-shaped protrusions 3a that are inserted into the respective engagement holes 4a and folded over. Thus, for use in an open deck cylinder block, the claw-shaped-protrusion clearance holes 2h, which are formed in the base plate 2 that faces the cylinder head, can prevent the appearance of a state wherein the folded over portions of the claw-shaped protrusions 3a are pressed against the deck face of the cylinder head, and are held between the two base plates 2 at positions outside the circumferential beads 2b in the radial direction of the cylinder holes 2a. Further, a phenomenon wherein the folded portions of the claw-shaped protrusions 3a function as shims, reducing the contact pressure on the circumferential beads 2b, can also be prevented.

Figure 13:
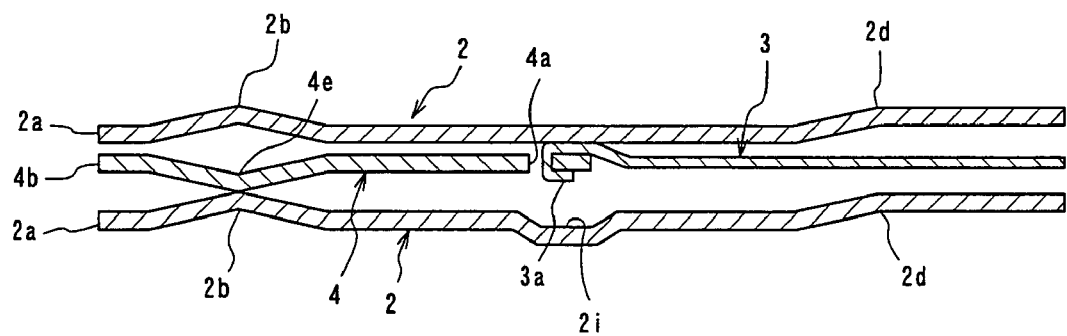
FIG. 13 is a cross-sectional view, taken at the same position as shown in FIG. 2, of the structure of a metal gasket for cylinder head according to a sixth embodiment of the present invention.

FIG. 13 is a cross sectional view of a metal gasket for cylinder head according to a sixth embodiment of this invention, and in the drawings, the portions corresponding to those in the previous embodiments are denoted by using the same reference numerals. A metal gasket for cylinder head 1 of the sixth embodiment, which is the same three-plate lamination type as that of the fifth embodiment, differs from the metal gasket for cylinder head 1 of the fifth embodiment only in that: in order to be appropriately used for an open deck type cylinder block, wherein the deck face is opened widely at the location of a cooling water jacket, unlike the base plate 2 in FIG. 8, a base plate (a lower base plate in the drawing) 2 that faces a cylinder block includes, as shown in FIG. 13, claw-shaped-protrusion clearance recesses 2i, which are, for example, embossed by pressure applied at positions corresponding to the claw-shaped-protrusion clearance holes 2h of the base plate 2 in FIG. 3 and are directed toward claw-shaped protrusions 3a while, like the base plate 2 in FIG. 8, a base plate (an upper base plate in FIG. 13) 2 that faces a cylinder head does not include claw-shaped-protrusion clearance holes 2h; and claw-shaped protrusions 3a, on an outer step adjustment plate 3, are inserted into engagement holes 4a in an inner step adjustment plate 4, from above the inner step adjustment plate 4, and the portions that extend outward, from the engagement holes 4a, are folded over, under the inner step adjustment plate. The other portions are arranged in the same manner as are those for the metal gasket for cylinder head 1 of the fifth embodiment.

According to the metal gasket cylinder head 1 of the sixth embodiment, the lower base plate 2, which faces the cylinder block, also includes the claw-shaped-protrusion clearance recesses 2i, which are aligned in the direction of the thickness of the metal gasket 1, relative to the respective claw-shaped protrusions 3a that are inserted into the engagement holes 4a and folded over. Thus, the convex portions, which are extended outside the lower base plate 2, corresponding to the claw-shaped-protrusion clearance recesses 2i formed in this base plate 2, enter the cooling water jacket opening of the deck face of the cylinder block, while the claw-shaped protrusions 3a of the outer step adjustment plate 3 enter the claw-shaped protrusion clearance recesses 2i that are formed in the lower base plate 2. Therefore, the same operational effects can be acquired as those obtained in the fifth embodiment. Further, according to the metal gasket for cylinder head 1 for the sixth embodiment, since the opening of the base plate 2 is prevented at the positions of the claw-shaped protrusions 3a because of the claw-shaped-protrusion clearance recesses 2i, the circulation of cooling water, between the cylinder block and the cylinder head, at an unnecessary locations can be avoided.

Figure 14:
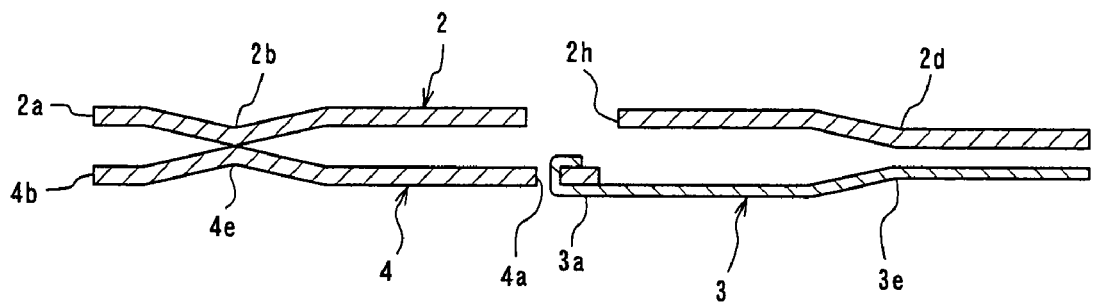
FIG. 14 is a cross-sectional view, taken at the same position as shown in FIG. 2, of the structure of a metal gasket for cylinder head according to a seventh embodiment of the present invention.

FIG. 14 is a cross-sectional view of a metal gasket for cylinder head according to a seventh embodiment of this invention, and in the drawing, portions corresponding to those in the previous embodiments are denoted by using the same reference numerals. A metal gasket for cylinder head 1 of the seventh embodiment, unlike those in the first to the sixth embodiments, is of a two-plate lamination type, and is arranged by laminating one base plate 2, which has the same structure as the base plate (an upper base plate in the drawing) 2 of the first embodiment that faces a cylinder head, and a one step adjustment plate, which is obtained when an outer step adjustment plate 3 has the same structure as the outer step adjustment plate 3 of the fourth embodiment, except that an outer bead 3e, corresponding to the outer bead 2d of the base plate 2, is coupled with an inner step adjustment plate 4 having the same structure as the inner step adjustment plate 4 of the fourth embodiment, and that the direction in which the circumferential bead 4e is projected is changed and is the reverse of that in the fourth embodiment, by fitting claw-shaped protrusions 3a, for the outer step adjustment plate 3, into engagement holes 4a in the inner step adjustment plate 4, from below the inner step adjustment plate 4, in the same manner as in the previous first, second, fourth and fifth embodiments, and by folding over the claw-shaped protrusions 3a on the inner step adjustment plate 4.

According to the metal gasket for cylinder head 1 of the seventh embodiment, the same operating effects as in the first to the sixth embodiments can be acquired with the two-plate lamination arrangement.

Figure 15:
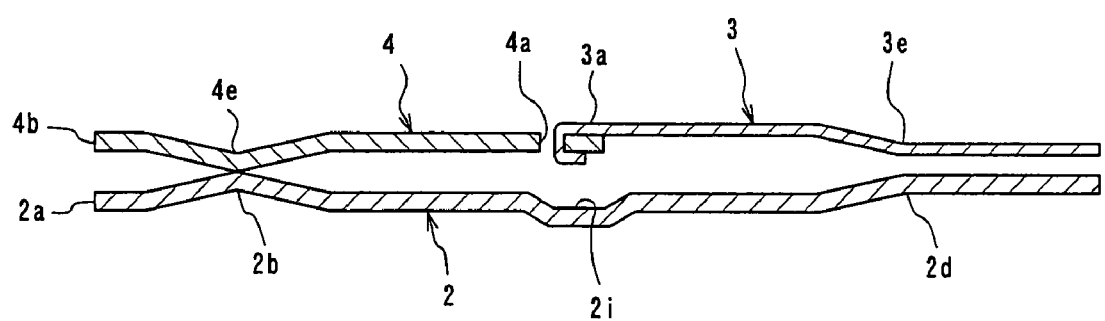
FIG. 15 is a cross-sectional view, taken at the same position as shown in FIG. 2, of the structure of a metal gasket for cylinder head according to an eighth embodiment of the present invention.

FIG. 15 is a cross-sectional view of a metal gasket for cylinder head according to an eighth embodiment of this invention, and in the drawing, portions corresponding to those in the previous embodiments are denoted by using the same reference numerals. A metal gasket for cylinder head 1 of the eighth embodiment is the of same two-plate lamination type as of the seventh embodiment, and differs from the metal gasket for cylinder head 1 of the seventh embodiment only in that: the locations of a base plate 2 and a step adjustment plate are vertically the reverse of those in the seventh embodiment; at positions corresponding to the claw-shaped-protrusion clearance holes 2h of the base plate 2 in FIG. 1, the base plate 2 located below, which faces a cylinder block, includes, as shown in FIG. 15, claw-shaped-protrusion clearance recesses 2i that are embossed, for example, by pressing and are directed claw-shaped protrusions 3a; and claw-shaped protrusions 3a of an outer step adjustment plate 3 are inserted from above into engagement holes 4a in an inner step adjustment plate 4, and the portions extending outward from the engagement holes 4a are folded over under the inner step adjustment plate 4. The other portions are formed in the same manner as in the metal gasket for cylinder head 1 of the seventh embodiment.

According to the above described metal gasket for cylinder head of the eighth embodiment, the base plate 2 that faces the cylinder head also includes claw-shaped-protrusion clearance recesses 2i that are aligned in the direction of the thickness of the metal gasket 1, relative to the claw-shaped protrusions 3a that are inserted into the engagement holes 4a and folded over. Therefore, the convex portions, which are extended outside the base plate 2 corresponding to the claw-shaped-protrusion clearance recesses 2i formed in this base plate 2, are entered inside the cooling water holes in the deck face of the cylinder head, and the claw-shaped protrusions 3a of the outer step adjustment plate 3 are entered into the claw-shaped-protrusion clearance recesses 2i formed in the base plate 2. Therefore, the same operational effects as obtained in the seventh embodiment can be acquired. Furthermore, according to the metal gasket for cylinder head 1 of the eighth embodiment, since the opening of the base plate 2 is prevented at the positions of the protrusions 3a because of the claw-shaped-protrusion clearance recesses 2i, the circulation of cooling water between the cylinder block and the cylinder head at unnecessary locations can be avoided.

An explanation has been given by employing illustrated examples; however, the present invention is not limited to the above described examples. For example, although not shown, an outer base plate (denoted, for easy understanding, by the same reference numeral as used for the outer step adjustment plate) 3, which has the same structure as the outer step adjustment plate 3 in the seventh or eighth embodiment, and an inner base plate (denoted, for easy understanding, by the same reference numeral as used for the inner step adjustment plate) 4, which has the same structure as the outer step adjustment plate 4 in the fourth embodiment, may be coupled together, in the same manner as in the previous embodiments, by folding over claw-shaped protrusions 3a on the outer base plate 3 that have been inserted into the individual engagement holes 4a of the inner base plate 4, so that a metal gasket for cylinder head of a single plate type may be provided. In this case, the claw-shaped protrusions 3a need only be projected inside the cooling water holes in the cylinder head or the cooling water jacket opening, or the cooling water hole in the cylinder block.

Further, in this invention, the individual claw-shaped protrusions may be formed on the inner step adjustment plate or the inner base plate, and the engagement holes may be formed in the outer step adjustment plate or in the outer base plate.

Furthermore, in this invention, claw-shaped-protrusion clearance recesses may be formed in the two base plates. In addition, the metal gasket for cylinder head of the third, sixth and eighth embodiments can also be applied for a closed deck type cylinder block. In this case, when convex portions project outside the base plate, corresponding to the claw-shaped-protrusion recesses formed in the base plate, these convex portions need only be projected inside the cooling water holes in the deck face of the cylinder block.

Moreover, in this invention, the claw-shaped protrusion clearance recesses may be formed by electric discharge machining, so that corresponding convex portions do not project outside the base plate.

INDUSTRIAL APPLICABILITY

In conclusion, according to the metal gasket for cylinder head of this invention, the step difference can be adjusted by employing a difference in the thickness of the outer step adjustment plate and the inner step adjustment plate, which is thicker than the former, and the lower limit of the step adjustment is equal to the lower limit of the difference in the thickness of the outer step adjustment plate and the inner step adjustment plate, which is thicker than the former. Therefore, even a small step difference can be arranged in order to appropriately balance a contact pressure applied to the circumferential beads and the outer bead.

In addition, according to the metal gasket for cylinder head of this invention, since the outer step adjustment plate and the inner step adjustment plate are coupled by press machining, a welding equipment and processing are not required, compared with when these plates are to be welded and coupled, so that a gasket can be manufactured at a lower cost.

The invention claimed is:

1. A metal gasket for a cylinder head, said metal gasket having a lamination of plates and comprising:
   two base plates (2) formed of metal plates, each of said base plates comprising cylinder holes (2a) formed corresponding to cylinder bores in a cylinder block on which a cylinder head for an internal combustion engine is mounted, circumferential beads (2b) having a both-sided sloped shape in cross section and formed around peripheries of said cylinder holes, cooling water holes (2c), formed outside peripheries of said circumferential beads corresponding to a cooling water jacket for said cylinder block and cooling water holes in said cylinder head, and an outer bead (2d) having a one-sided sloped shape in cross section and formed and positioned so as to entirely enclose said circumferential beads and said cooling water holes, wherein said circumferential beads (2b) of said two base plates (2) are aligned in the direction of thickness of said metal gasket, and
   claw-shaped protrusions (3a) provided for one of an outer step adjustment plate (3) and an inner step adjustment plate (4) are inserted into engagement holes in the other of said inner step adjustment plate and said outer step adjustment plate,
   said outer step adjustment plate (3) is formed of a metal plate and extending from the position of said cooling water jacket to the positions of the outer edges of said base plates (2), while said inner step adjustment plate (4) is formed of a metal plate having a thicker thickness than said outer step adjustment plate (3) and extending from locations inside said circumferential beads (2b) of said base plates (2), to the position of said cooling water jacket, and
   portions of said claw-shaped protrusions (3a) projecting through said engagement holes are folded over so as to couple said outer adjustment plate (3) and said inner step adjustment plate (4), and thus placing said outer adjustment plate (3) and said inner step adjustment plate (4) between said two base plates (2).

2. The metal gasket for a cylinder head according to claim 1, characterized in that,
relative to said claw-shaped protrusions (3a) inserted into said engagement holes (4a) and folded over, claw-shaped protrusion clearance holes (2h) are formed in at least one of said two base plates (2) to be aligned in the direction of thickness of said metal gasket.

3. The metal gasket for a cylinder head according to claim 2, characterized in that,
other circumferential beads (4e) which have a both sided sloped shape in cross section are formed in said inner step adjustment plate (4) to be arranged relative to said circumferential beads (2b) of said base plate (2), in the direction of the thickness of said metal gasket and projected in opposite direction to one of said circumferential beads (2b).

4. The metal gasket for a cylinder head according to claim 2, characterized in that,
said claw-shaped protrusions (3a) are provided for said outer step adjustment plate (3), and said engagement holes (4a) are formed in said inner step adjustment plate (4).

5. The metal gasket for a cylinder head according to claim 1, characterized in that,
relative to said claw-shaped protrusions (3a) inserted into said engagement holes (4a) and folded over, claw-shaped protrusion clearance recesses (2i) facing said claw-shaped protrusions are formed in at least one of said two base plates, in the direction of the thickness of said metal gasket.

6. The metal gasket for a cylinder head according to claim 3, characterized in that,
other circumferential beads (4e) which have a both sided sloped shape in cross section are formed in said inner step adjustment plate (4) to be arranged relative to said circumferential beads (2b) of said base plate (2), in the direction of the thickness of said metal gasket and projected in opposite direction to one of said circumferential beads (2b).

7. The metal gasket for a cylinder head according to claim 5, characterized in that,
said claw-shaped protrusions (3a) are provided for said outer step adjustment plate (3), and said engagement holes (4a) are formed in said inner step adjustment plate (4).

8. The metal gasket for a cylinder head according to claim 1, characterized in that,
other circumferential beads (4e) which have a both sided sloped shape in cross section are formed in said inner step adjustment plate (4) to be arranged relative to said circumferential beads (2b) of said base plate (2), in the direction of the thickness of said metal gasket and projected in opposite direction to one of said circumferential beads (2b).

9. The metal gasket for a cylinder head according to claim 1, characterized in that,
said claw-shaped protrusions (3a) are provided for said outer step adjustment plate (3), and said engagement holes (4a) are formed in said inner step adjustment plate (4).

10. A metal gasket for a cylinder head, said metal gasket having a lamination of plates and comprising:
a base plate (2) formed of a metal plate, comprising cylinder holes (2a), formed corresponding to cylinder bores in a cylinder block on which a cylinder head for an internal combustion engine is mounted, circumferential beads (2b) having a both-sided sloped shape in cross section and formed around the peripheries of said cylinder holes, cooling water holes (2c) formed outside peripheries of said circumferential beads corresponding to a cooling water jacket for said cylinder block and cooling water holes in said cylinder head, and an outer bead (2d) having a one-sided sloped shape in cross section and formed and positioned so as to entirely enclose said circumferential beads and said cooling water holes,
claw-shaped protrusions (3a) provided for one of an outer step adjustment plate (3) and an inner step adjustment plate (4) are inserted into engagement holes in the other of said inner step adjustment plate and said outer step adjustment plate,
said outer step adjustment plate (3) is formed of a metal plate and extending from the position of said cooling water jacket to the positions of the outer edges of said base plates (2), while said inner step adjustment plate (4) is formed of a metal plate having a thicker thickness than said outer step adjustment plate (3) and extending from locations inside said circumferential beads (2b) of said base plates (2), to the position of said cooling water jacket, and
portions of said claw-shaped protrusions (3a) projecting through said engagement holes are folded over so as to couple said outer adjustment plate (3) and said inner step adjustment plate (4), and thus overlapping said outer adjustment plate (3) and said inner step adjustment plate (4) with said base plate (2).

11. The metal gasket for a cylinder head according to claim 10, characterized in that,
relative to said claw-shaped protrusions (3a) inserted into said engagement holes (4a) and folded over, claw-shaped protrusion clearance holes (2h) are formed in said base plate (2) to be aligned in the direction of thickness of said metal gasket.

12. The metal gasket for a cylinder head according to claim 5, characterized in that,
other circumferential beads (4e) which have a both sided sloped shape in cross section are formed in said inner step adjustment plate (4) to be arranged relative to said circumferential beads (2b) of said base plate (2), in the direction of the thickness of said metal gasket and projected in opposite direction to one of said circumferential beads (2b).

13. The metal gasket for a cylinder head according to claim 5, characterized in that,
said claw-shaped protrusions (3a) are provided for said outer step adjustment plate (3), and said engagement holes (4a) are formed in said inner step adjustment plate (4).

14. The metal gasket for a cylinder head according to claim 4, characterized in that,
relative to said claw-shaped protrusions (3a) that are inserted into said engagement holes (4a) and folded over, claw-shaped protrusion clearance recesses (2i) facing said claw-shaped protrusions are formed in said base plate (2) to be aligned in the direction of the thickness of said metal gasket.

15. The metal gasket for a cylinder head according to claim 14, characterized in that,
other circumferential beads (4e) which have a both sided sloped shape in cross section are formed in said inner step adjustment plate (4) to be arranged relative to said circumferential beads (2b) of said base plate (2), in the direction of the thickness of said metal gasket and projected in opposite direction to one of said circumferential beads (2b).

16. The metal gasket for a cylinder head according to claim 14, characterized in that,
said claw-shaped protrusions (3*a*) are provided for said outer step adjustment plate (3), and said engagement holes (4*a*) are formed in said inner step adjustment plate (4).

17. The metal gasket for a cylinder head according to claim 4, characterized in that,
other circumferential beads (4*e*) which have a both sided sloped shape in cross section are formed in said inner step adjustment plate (4) to be arranged relative to said circumferential beads (2*b*) of said base plate (2), in the direction of the thickness of said metal gasket and projected in opposite direction to one of said circumferential beads (2*b*).

18. The metal gasket for a cylinder head according to claim 10, characterized in that,
said claw-shaped protrusions (3*a*) are provided for said outer step adjustment plate (3), and said engagement holes (4*a*) are formed in said inner step adjustment plate (4).

19. A metal gasket for a cylinder head comprising:
a two-plate lamination formed of metal plates, said two-plate lamination having cylinder holes (4*b*) formed corresponding to cylinder bores in a cylinder block on which a cylinder head for an internal combustion engine is mounted, circumferential beads (4*e*) having a both-sided sloped shape in cross section and formed around the peripheries of said cylinder holes, cooling water holes (3*b*, 4*c*, 4*d*) formed outside the peripheries of said circumferential beads corresponding to a cooling water jacket for said cylinder block and cooling water holes in said cylinder head, and an outer bead (3*e*) having a one sided sloped shape in cross section and is formed and positioned so as to entirely enclose said circumferential beads and said cooling water holes,
claw-shaped protrusions (3*a*) provided for one of an outer base plate (3) and an inner base plate (4) of said two-plate lamination are inserted into engagement holes in the other of said inner base plate and said outer base plate,
said outer base plate (3) is formed of a metal plate and extending from the position of said cooling water jacket to the positions of the outer edges of said metal gasket (3, 4), while said inner base plate (4) is formed of a metal plate having a thicker thickness than said outer base plate (3) and extending from locations inside said circumferential beads (4*e*) of said base plate (4), to the position of said cooling water jacket, and
portions of said claw-shaped protrusions (3*a*) projecting through said engagement holes are folded over so as to couple said outer base plate (3) and said inner base plate (4).

20. The metal gasket for a cylinder head according to claim 9, characterized in that,
said claw-shaped protrusions (3*a*) are provided for said outer base plate (3), and said engagement holes (4*a*) are formed in said inner base plate (4).

* * * * *